United States Patent [19]
Hirose et al.

[11] Patent Number: 6,104,002
[45] Date of Patent: *Aug. 15, 2000

[54] HEAT TREATING APPARATUS

[75] Inventors: Osamu Hirose; Kiyohisa Tateyama, both of Kumamoto, Japan

[73] Assignee: Tokyo Electron Limited, Tokyo, Japan

[*] Notice: This patent is subject to a terminal disclaimer.

[21] Appl. No.: 09/115,698

[22] Filed: Jul. 15, 1998

Related U.S. Application Data

[63] Continuation of application No. 08/642,898, May 6, 1996, Pat. No. 5,834,737.

[30]     Foreign Application Priority Data

May 12, 1995 [JP] Japan ................................. 7-138740
[51] Int. Cl.$^7$ .................................................. C23C 16/00
[52] U.S. Cl. ......................... 219/390; 392/418; 118/729; 414/935

[58] Field of Search ........................... 219/390; 392/418; 118/728, 729, 500; 414/935, 936

[56]       References Cited

U.S. PATENT DOCUMENTS

| | | | |
|---|---|---|---|
| 4,790,258 | 12/1988 | Drage et al. ............................. | 118/500 |
| 5,016,332 | 5/1991 | Reichelderfer et al. ............... | 29/25.01 |
| 5,665,167 | 9/1997 | Deguchi et al. ......................... | 118/728 |
| 5,669,977 | 9/1997 | Shufflebotham et al. ............... | 118/728 |

*Primary Examiner*—Joseph Pelham
*Attorney, Agent, or Firm*—Oblon, Spivak, McClelland, Maier & Neustadt, P.C.

[57]           ABSTRACT

A substrate heat treating apparatus with a substrate support plate having a plurality of holes, a heating element to heat the substrate through the support plate, and substrate support pins extending through the plurality of holes in the support plate. Each support pin is mounted so that it is slidable in a horizontal direction within each of the plurality of holes in the support plate.

9 Claims, 6 Drawing Sheets

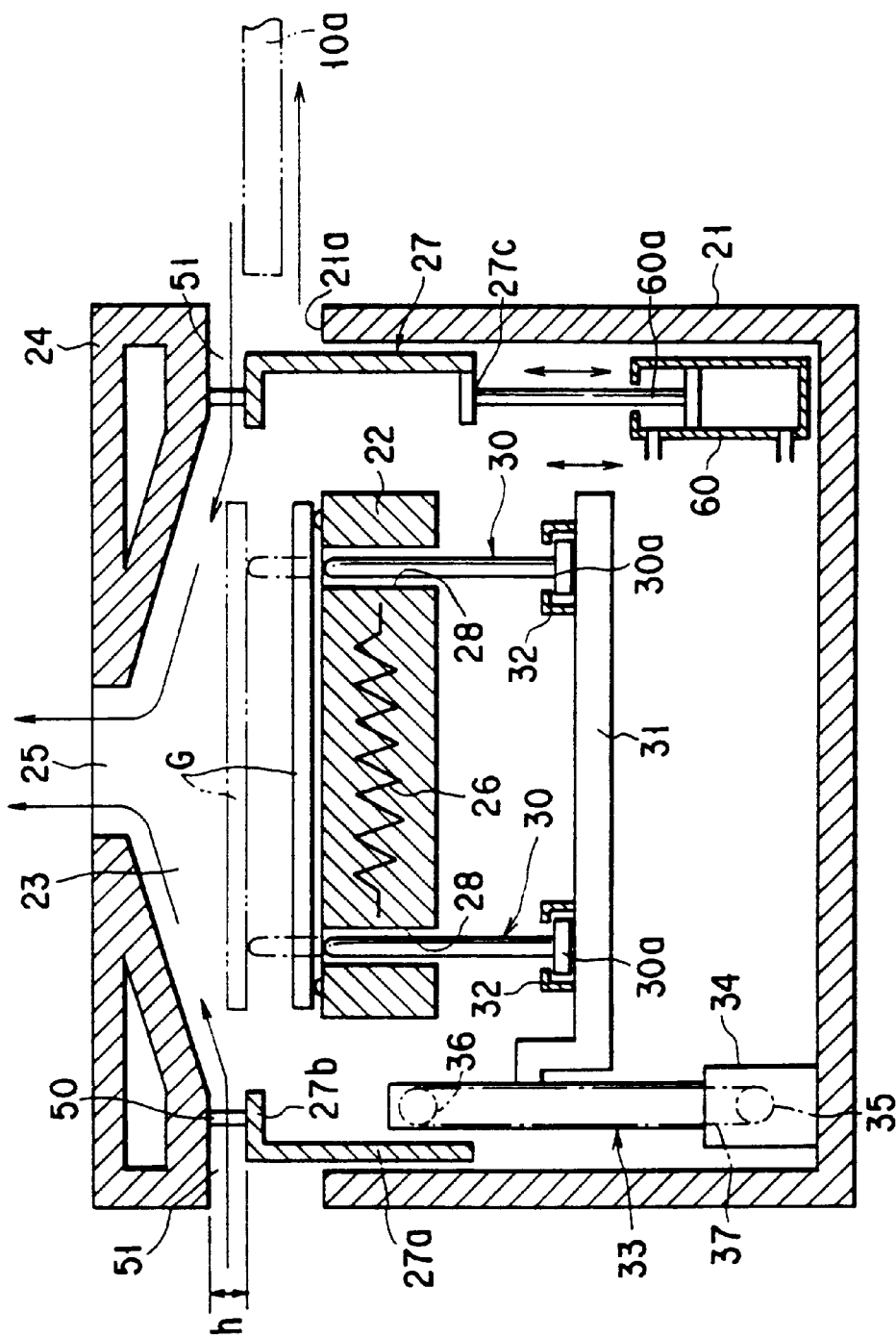
F I G. 3

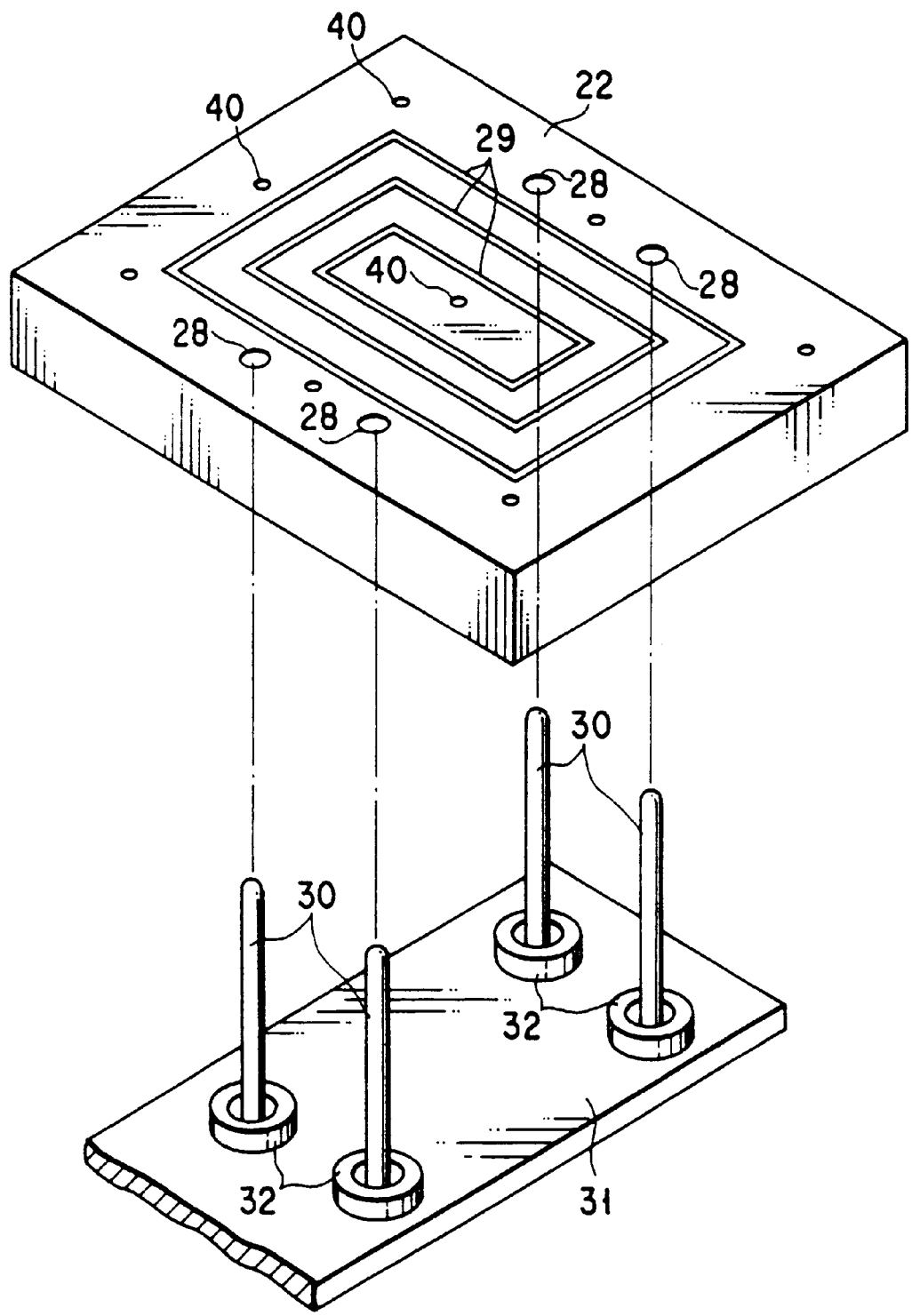
F I G. 4

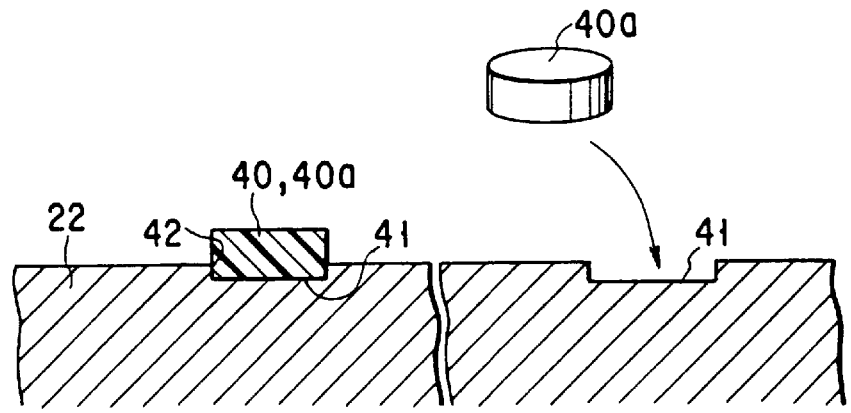
F I G. 7A
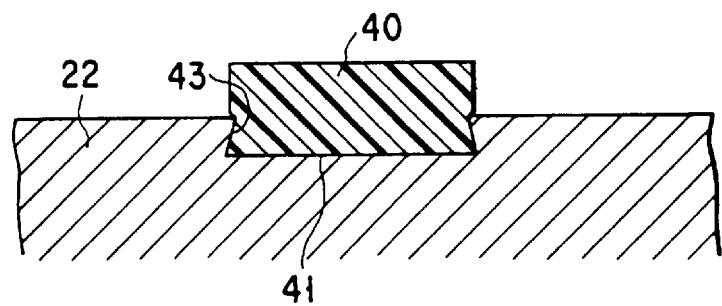
F I G. 7B
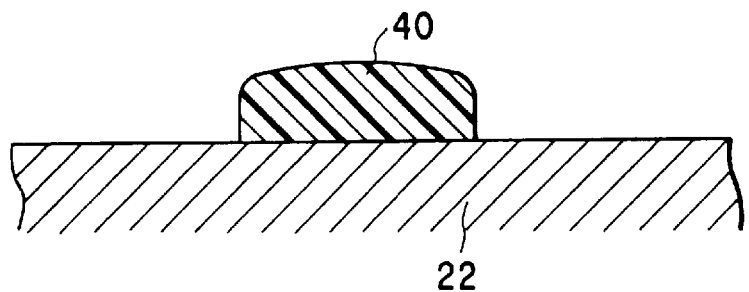
F I G. 7C

HEAT TREATING APPARATUS

This application is a continuation of Ser. No. 08/642,898, filed May 6, 1996, now U.S. Pat. No. 5,834,737.

BACKGROUND OF THE INVENTION

1. Field of the Invention

The present invention relates to a heat treating apparatus for applying a heat treatment to an object such as a liquid crystal display (LCD) substrate.

2. Description of the Related Art

In the manufacture of a liquid crystal display (LCD) device, a thin film of, for example, ITO (Indium Tin Oxide) or an electrode pattern is formed in general on the surface of an LCD substrate made of glass. For forming the ITO thin film or electrode pattern, a photolithography technique widely employed in the manufacture of a semiconductor device is used for forming a resist film on the LCD substrate, followed by copying a desired circuit pattern onto the resist film.

To be more specific, an object to be treated, e.g., a rectangular LCD substrate, is washed in a washing device, followed by applying a hydrophobic treatment, i.e., treatment to make the substrate surface hydrophobic, to the LCD substrate in an adhesion treating device. Further, the LCD substrate is cooled in a cooling device, followed by forming a resist film by coating on the LCD substrate in a resist coating device. The resultant resist film is subjected to a baking treatment in a heat treating apparatus, followed by selectively exposing the baked resist film to light in an exposure device so as to copy a desired pattern onto the resist film. Still further, a developing solution is applied to the LCD substrate in a developing device after the exposure to light so as to develop the pattern transferred onto the resist film, followed by washing the excess developing solution with a rinsing solution.

The heat treating apparatus for applying a baking treatment to the resist film formed on the LCD substrate comprises a support plate having the LCD substrate disposed thereon, a heating means such as an electric heater for heating the LCD substrate via the support plate, support pins extending through the support plate to support the LCD substrate, and a lift mechanism for moving said support pins in a vertical direction. Where the heat treating apparatus of the particular construction is used for applying a baking treatment to the resist film formed on the LCD substrate, the heat generation from the heating means is controlled so as to heat the support plate to a predetermined temperature, e.g., 120 to 150° C.

If the support plate is heated to, for example, 120 to 150° C. in the conventional heat treating apparatus, however, the support plate is thermally expanded, leading to variation of the position of the holes in the support plate. It should be noted in this connection that, under room temperature before the heat treatment, the support pins 103 extend through the holes 102 made in the support plate 101 such that these pins 103 are not in contact with the walls defining these holes 102, as shown in FIG. 1A. However, when the support plate 101 is heated to a high temperature during the heat treatment, the thermal expansion of the support plate causes the support pins 103 to be brought into contact with the walls defining the holes 102. As a result, the support pins 103 are inclined when moved though the holes 102, as shown in FIG. 1B. of course, the inclination of these support pins 103 gives detrimental effects to the LCD substrate supported by the support plate 101. The effect given to the LCD substrate by this inclination is increased with increase in the size of the substrate. What should also be noted is that the direct contact between the support pin 103 and the wall defining the hole 102 brings about particle generation, leading to reduction of the yield. These difficulties tend to be rendered more serious with increase in the size of the support plate 101 and with elevation of the heating temperature.

Also known is a heat treating apparatus comprising an air cylinder for driving a shutter member for opening/closing the treating space of the apparatus. In the heat treating apparatus of this type, however, it is difficult to control as desired the clearance formed between a cover member arranged to define a treating space together with the support plate 101 and a shutter member, making it difficult to maintain the clearance at a desired level. As a result, it is impossible to ensure a desired amount of air introduction into the heat treating apparatus, leading to an uneven heating of the LCD substrate and, thus, to a low yield.

SUMMARY OF THE INVENTION

An object of the present invention is to prevent a support pin from being brought into direct contact with the wall of a hole made through a support plate so as to improve the yield. Another object is to set a clearance for air introduction during the heat treatment at a desired value so as to make the heating temperature uniform and, thus, to improve the yield.

According to a first aspect of the present invention, there is provided a heat treating apparatus, comprising a support plate having an object to be treated disposed thereon; heating means for heating the object through the support plate; and support pins extending through the support plate so as to support the object; wherein the support plate is provided with holes each sized large enough to permit a horizontal movement of the support pin, and the support pin is movable in a horizontal direction within the hole made in the support plate.

According to a second aspect of the present invention, there is provided a heat treating apparatus, comprising a support plate arranged within a treating chamber and having an object to be treated disposed thereon; heating means for heating the object through the support plate; a cover member arranged in the treating chamber to define a treating space between the support plate and the cover member; a shutter member partitioning the treating space and capable of opening/closing the partitioned treating space; and a gap setting member disposed between the cover member and the shutter member.

BRIEF DESCRIPTION OF THE DRAWINGS

FIG. 3 is a cross sectional view schematically showing a heat treating apparatus according to one embodiment of the present invention;

FIG. 4 is an oblique view showing in a broken fashion the support plate and the support pins included in the heat treating apparatus of the present invention;

FIGS. 7A to 7C are cross sectional views each showing the type of a proximity spacer mounted to the support plate included in the heat treating apparatus of the present invention.

DETAILED DESCRIPTION OF THE PREFERRED EMBODIMENTS

The heat treating apparatus of the present invention is featured in that the support plate is provided with holes each sized large enough to permit support pins to move in a horizontal direction, and that the support pins are movable in a horizontal direction within the holes made in the support plate. The particular construction makes it possible for the support pins to move suitably within the holes even if the relative positions between the support pins and the holes made in the support plate are displaced by a thermal expansion of the support plate during the heat treating operation. As a result, the support pins are kept projecting upright through the holes made in the support plate without being inclined in spite of the thermal expansion of the support plate during the heat treatment, making it possible for the support pins to receive objects to be treated and to deliver the treated objects. It should be noted that the support pins, which are not inclined, are not brought into contact with the walls defining the holes made in the support plate, making it possible to prevent wear of the support pins and particle generation which are caused by the direct contact between the support pins and the walls defining the holes made in the support plate.

It is desirable for the support pin to comprise a metallic pin body having a rigidity, and an auxiliary upper portion having a corrosion resistance made of a resin. It is also desirable for the wall defining the hole made in the support plate to be coated with a resin film. Where the support pin and the wall defining the hole made in the support plate are constructed as described above, it is possible to ensure suppressing the wear of the support pin and the particle generation caused by the direct contact between the support pin and the wall of the hole.

The heat treating apparatus of the present invention also comprises a cover member arranged in said treating chamber to define a treating space between the support plate and said cover member, a shutter member partitioning said treating space and capable of opening/closing the partitioned treating space; and a gap setting member disposed between said cover member and said shutter member. The gap setting member permits maintaining accurately a desired distance between the cover member and the shutter member such that a desired amount of air can be introduced into and discharged from the treating chamber. As a result, the air stream can be made uniform so as to make the heating temperature uniform. The gap setting member used in the heat treating apparatus of the present invention includes, for example, a projection, a spacer, etc. For example, a projection formed in one of the cover member and the shutter member can be used as a gap setting member in the apparatus of the present invention. The shape and number of gap setting members can be determined optionally in the present invention.

Figure 1A:
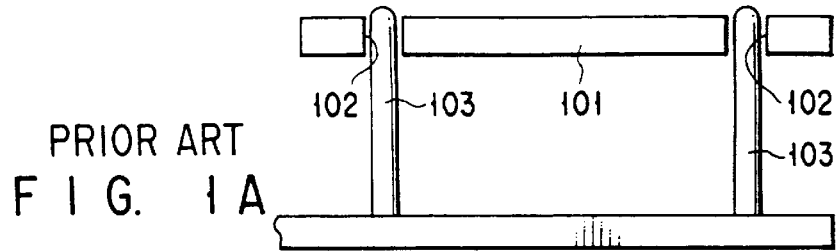
FIGS. 1A and 1B are cross sectional views collectively showing schematically a difficulty inherent in a conventional heat treating apparatus.
Figure 1B:
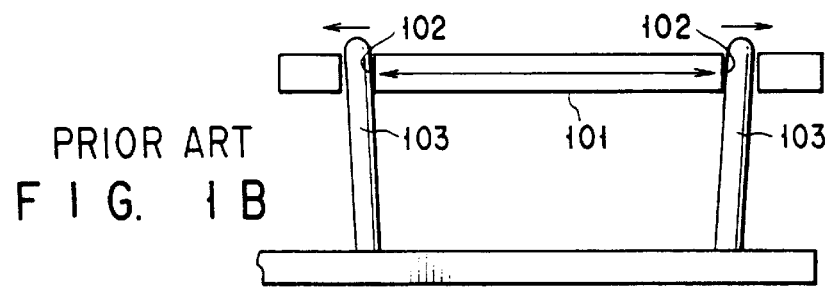
Figure 2:
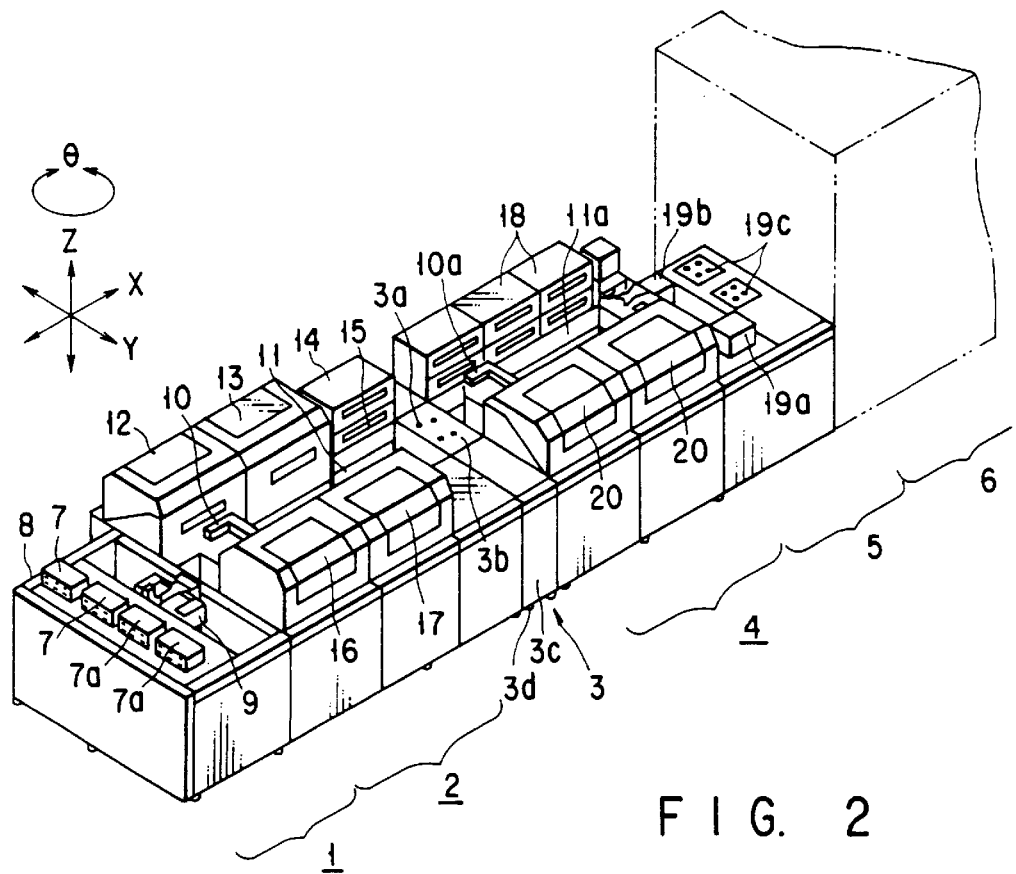
FIG. 2 is an oblique view showing a coating-developing system for LCD substrates having a heat treating apparatus of the present invention incorporated therein.

FIG. 2 shows a coating-developing system for LCD substrates having a heat treating apparatus of the present invention incorporated therein. As shown in the drawing, the coating-developing system comprises a loader section 1 for putting an LCD substrate G, i.e., object to be processed, in and out of the system, a first processing section 2 of the substrate G, and a second processing section 4 connected to the first processing section 2 with a relay section 3 interposed therebetween. It is possible to connect an exposure device 6, which is for selectively exposing a resist film to light so as to copy a predetermined fine pattern onto the resist film, to the second processing section 4 with a delivery section 5 interposed therebetween.

The loader section 1 comprises a cassette support plate 8 and a pincette 9. The cassette support plate 8 serves to support a cassette 7 having untreated substrates G housed therein, and a cassette 7a having treated substrates G housed therein. On the other hand, the pincette 9 is movable both in a horizontal direction (X-, Y-directions) and in a vertical direction (Z-direction), and swingable within an angle θ so as to put the substrate G in and out of the cassettes 7 and 7a.

The first processing section 2 comprises a main arm 10 movable in X-, Y-, Z-directions, swingable within an angle θ, and having a transfer path 11. Arranged on one side of the transfer path 11 of the main arm 10 are a brush cleaning device 12 for cleaning the substrate G with a brush, a jet water cleaning device 13 for cleaning the substrate G with a high pressure jet water, an adhesion treating device 14 for applying a hydrophobic treatment to the surface of the substrate G to make the surface hydrophobic, and a cooling device 15 for cooling the substrate G to a predetermined temperature. On the other hand, a resist coating device 16 and a coated film-removing device 17 are arranged on the other side of the transfer path 11 of the main arm 10.

Like the first processing section 2, the second processing section 4 comprises a main arm 10a movable in X-, Y-, Z-directions, swingable within an angle θ, and having a transfer path 11a. A heat treating apparatus of the present invention for applying a pre-baking or post-baking to the substrate G before or after the resist solution coating step is arranged on one side of the transfer path 11a of the main arm 10a, with a developing device 20 arranged on the other side of the transfer path 11a.

The relay section 3 comprises a box 3c having casters 3d mounted to the bottom plate and also having a delivery plate 3b mounted to the ceiling plate. Support pins 3a for supporting the substrate G project upward from the delivery plate 3b. It is possible to remove, if necessary, the relay section 3 from the coating-developing system such that a space for performing repairs, inspection, etc. in the first or second processing section can be provided between the first processing section 2 and the second processing section 4.

Disposed in the delivery section 5 are a cassette 19a for temporality storing the substrate G, a pincette 19b for transferring the substrate G between the cassette 19a and the main arm 10a, and a delivery plate 19c of the substrate G.

In the coating-developing system of the construction described above, the untreated substrate G housed in the cassette 7 is taken out by the pincette 9 included in the loader section 1 and, then, transferred onto the main arm 10 of the first processing section 2. Further, the untreated substrate G is transferred into the brush cleaning device 12. The substrate G subjected to the brush cleaning within the brush cleaning section 12 is subjected to cleaning with a high pressure jet water, if necessary, within the jet water cleaning device 13. Further, the substrate G is subjected to a hydrophobic treatment within the adhesion processing device 14, followed by cooling the substrate G within the cooling device 15 and subsequently forming a resist film, i.e., a photosensitive film, on the surface of the substrate G within the resist coating device 16. After formation of the resist film, an excess resist film, which is not required, is removed from the peripheral portion of the substrate G in the coated film-removing device 17. Then, a baking treatment is applied to the remaining resist film in the heat treating apparatus 18 of the present invention, followed by selectively exposing the baked resist film to light in the exposure device 6 so as to copy a predetermined pattern onto the resist film. The substrate G after the light-exposure treatment is transferred into the developing device 20 for development of the copied pattern with a developing solution 1, followed by washing away the residual developing solution with a rinsing solution so as to finish the developing treatment. Finally, the substrate G after the developing treatment is housed in the cassette 7a within the loader section 1 so as to be transferred to the subsequent process step.

FIG. 3 schematically shows the construction of the heat treating apparatus 18 of the present invention included in the coating-developing system for LCD substrates shown in FIG. 2. As shown in FIG. 3, the heat treating apparatus of the present invention comprises a treating chamber 21 having a support plate 22 arranged therein. An object to be treated, i.e., the substrate G such as an LCD substrate made of glass, is disposed on the support plate 22. A heater 26 for heating the substrate G is arranged as a heating means within the support plate 22 made of, for example, an aluminum alloy. Also, a temperature sensor (not shown) is mounted to the support plate 22 such that the heating temperature can be controlled as desired within a range of, for example, 120° C. to 150° C.

An upper wall 24 acting as a cover member is formed to cover an upper portion of the treating chamber 21 such that a treating space 23 is defined between the upper wall 24 and the support plate 22. An exhaust port 25 is formed in the central portion of the upper wall 24 of the treating chamber. The upper wall 24 is attached to a movable door 27, which is movable in a vertical direction and acts as a shutter member, with a gap setting projection interposed therebetween, said gap setting projection being described herein later. An opening 21a between the treating chamber 21 and the upper wall 24 is opened or closed by the movement of the door 27 in a vertical direction so as to open or close the treating space 23.

Figure 5:
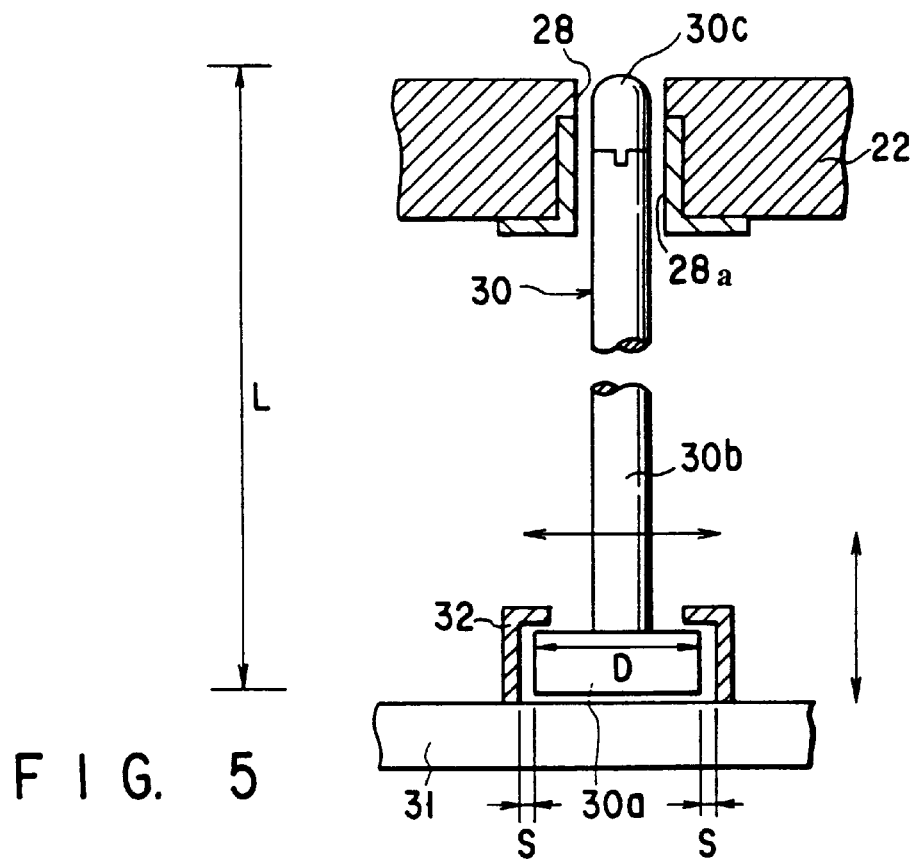
FIG. 5 shows in a magnified fashion the support plate and the support pin included in the heat treating apparatus of the present invention.

As shown in FIG. 4, four holes 28 are formed through the support plate 22. Support pins 30 for supporting the substrate G are freely inserted through these holes 28. It should be noted that the hole 28 made through the support plate 22 is large enough to permit the support pin 30 to be moved in a horizontal direction. FIG. 5 shows that the support pin 30 comprises a pin body 30b made of stainless steel and having a leg portion 30a at the lower end portion and an auxiliary portion 30c formed on an upper end of the pin body 30b, made of, for example, PEEK (polyether-ether-ketone), fluoroelastomer, or fluoroplastic such as tetrafluoroethylene and having a corrosion resistance. It is seen that the leg portion 30a is supported movable in a horizontal direction by a cylindrical support member 32 mounted to the upper surface of a holding member 31. To be more specific, a clearance s, which is, for example, about 1 mm, i.e., 2s=2 mm, is provided between the leg portion 30a of the support pin 30 and the support member 32 so as to permit the support pin 30 to be movable in a horizontal direction. Incidentally, it is desirable to set appropriately a ratio D/L, where D is the width of the leg portion 30a, and L is the length of the support pin 30 including the bottom of the leg portion 30a and the tip of the auxiliary portion 30c. For example, the ratio D/L should desirably be set at 0.2 or more in view of a slidability of the leg portion, jamming of the leg portion, and the like.

It is possible to obtain, for example, a desired mechanical strength by using a stainless steel for forming the pin body 30b. Also, where the auxiliary portion 30c of the support pin 30 is made of PEEK, it is possible to prevent particle generation caused by the contact of the auxiliary portion 30c with the wall defining the hole 28. It should also be noted that a corrosion resistant coating film 28a made of, for example, a fluoroplastic or a sintered body thereof is formed to cover the surface of the wall defining the hole 28 and to cover the lower end portion around the hole 28. It suffices for the coating film 28a, which performs the function of a slide bearing, to be formed to cover at least the wall defining the hole 28. To reiterate, the support pin 30 comprises an auxiliary portion 30c made of a synthetic resin. Also, the coating film 28a made of a synthetic resin is formed to cover at least the wall defining the hole 28 extending through the support plate 22. Because of the particular construction, it is possible to suppress the particle generation caused by the contact of the support pin 30 with the wall defining the hole 28.

The holding member 31 for holding the four support pins 30 is joined to a lift mechanism 33 and, thus, is movable in a vertical direction. To be more specific, the support pins 30 can be moved upward to project upward through the holes 28 made in the support plate 22. As shown in FIG. 3, the lift mechanism 33 comprises a stepping motor 34, which is a driving motor, a driving pulley 35 driven by the stepping motor 34, a driven pulley 36 arranged above the driving pulley 35, and a timing belt 37 stretched between the driving pulley 35 and the driven pulley 36 and joined to the holding member 31. As apparent from the drawing, the support pins 30 are moved upward or downward through the holes 28 made in the support plate 22 in accordance with rotation of the stepping motor 34 in the counterclockwise direction or the clockwise direction.

As shown in FIG. 4, a plurality of grooves 29 each forming a closed loop are formed on the upper surface of the support plate 22 (three grooves being shown in the drawing). The loops of these grooves 29, which are for performing a vacuum suction, are oblong and concentric with each other. Each groove 29 has a width of, for example, 1 mm and a depth of, for example, 1 mm. These grooves 29 are used for holding by vacuum suction a plurality of substrates G of different sizes on the support plate 22. Also formed on the upper surface of the support plate 22 are proximity spacers 40 projecting upward so as to provide a predetermined clearance (proximity gap) of 0.1 to 0.5 mm between the substrate G and the support plate 22.

FIGS. 7A, 7B and 7C show how the proximity spacers 40 are mounted to the upper surface of the support plate 22. Specifically, FIG. 7A shows that a punched piece 40a made of, for example, a polyimide tape is mounted to a positioning recess 41 made in the upper surface of the support plate 22 with a heat-resistant adhesive 42 interposed therebetween so as to form the proximity spacer 40. FIG. 7B shows that a punched piece as in FIG. 7A is pushed under pressure into a positioning recess 41 having an open portion 43 tapered from the bottom of the recess 41 toward the upper portion. Alternatively, molten particles of a ceramic material or silicon dioxide can be flame-sprayed selectively onto the upper surface of the support plate 22 to form the proximity spacer 40, as shown in FIG. 7C. Where the proximity spacers 40 made of polyimide, ceramic material or silicon dioxide are formed on the surface of the support plate 22, no damage is done to the substrate G held by the support plate 22. It is also possible to prevent generation of an electrostatic charge. It should be noted in this connection that, if the surface of the support plate 22 is coated with, for example, a silicon dioxide film, a potential difference is not generated at all between the surface of the support plate 22 and the substrate G, making it possible to eliminate completely the electrostatic charge generation. Incidentally, if a satin-like layer of a high hardness is formed on the surface of the support plate 22 by flame-spraying of a ceramic material, the contact area between the support plate 22 and the substrate G can be decreased so as to improve the wear resistance, compared with the conventional technique of employing a Tuframe treatment.

Figure 6:
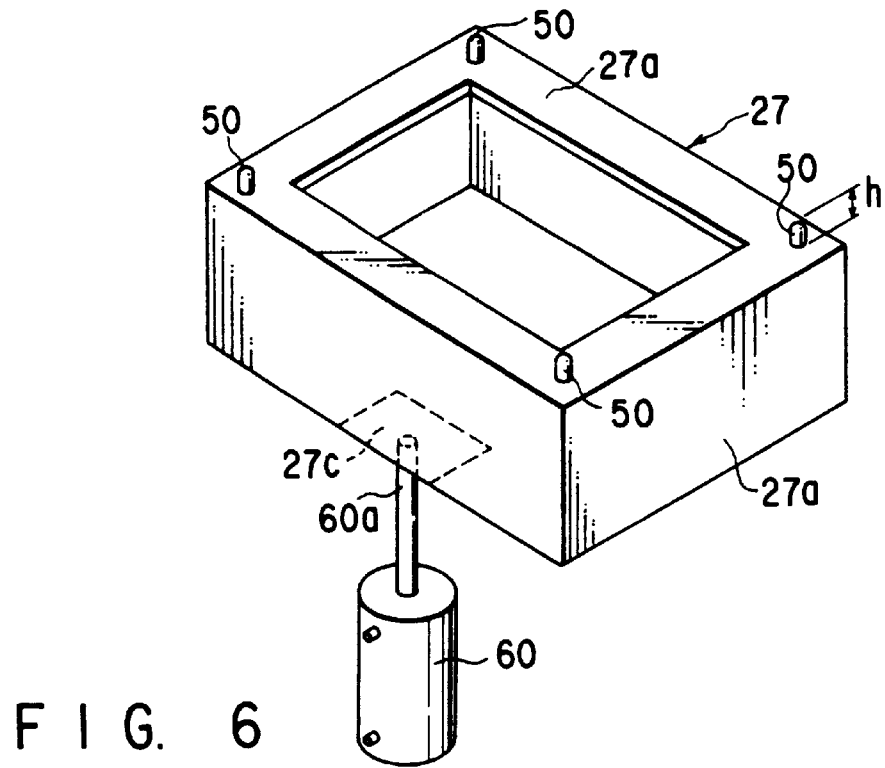
FIG. 6 is an oblique view showing a shutter member included in the heat treating apparatus of the present invention.

FIG. 6 shows that the movable door 27 comprises a cylindrical body 27a having a rectangular cross section and a horizontal piece 27b, which is shown in FIG. 3, extending inward and mounted to the upper end of the cylindrical body 27a to face the lower surface of the upper wall 24 of the treating chamber. Gap setting projections 50 each having a height h of, for example, 1 to 5 mm are mounted to project upward in the four corner portions of the horizontal piece 27b. A bracket 27c projecting downward is mounted to the lower surface of the cylindrical body 27a of the movable door 27, and a lift mechanism consisting of, for example, an air cylinder 60 and a piston rod 60a, is joined to the bracket 27c. Specifically, the piston rod 60a is joined to the bracket 27c such that the door 27 is moved in a vertical direction by driving the air cylinder 60 so as to open or close the opening 21a of the treating chamber 21 and, thus, to open or close the treating space 23. When the movable door 27 is moved upward, the gap setting projections 50 are allowed to abut against the lower surface of the upper wall 24 of the treating chamber so as to define an air inlet port 51 held at a predetermined height h between the lower surface of the upper wall 24 of the treating chamber and the upper surface of the movable door 27. It follows that, during the heat treatment of the substrate G, a predetermined amount of an external air is introduced through the air inlet port 51 into the treating space 23 so as to make constant the air flow rate discharged through the exhaust port 25. As a result, the heating temperature of the substrate G can be made uniform.

Figure 8A:
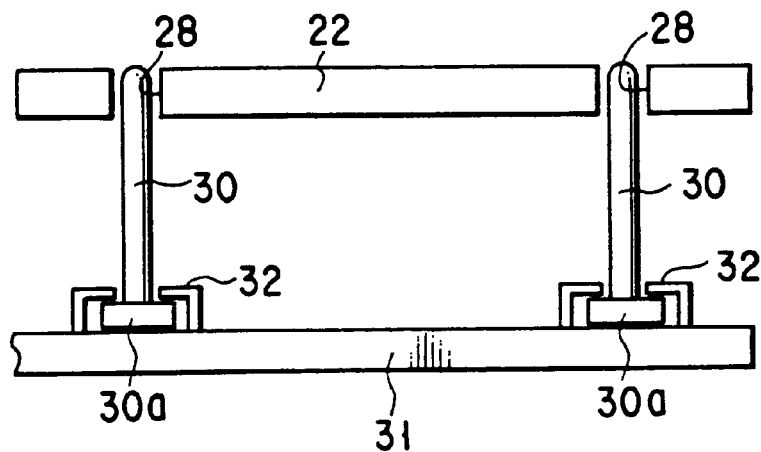
FIGS. 8A and 8B are cross sectional views collectively showing schematically the positional relationship between the support plate and the support pins in the heat treating apparatus of the present invention, FIG. 8A showing the relationship under room temperature with FIG. 8B showing the relationship during heating.
Figure 8B:
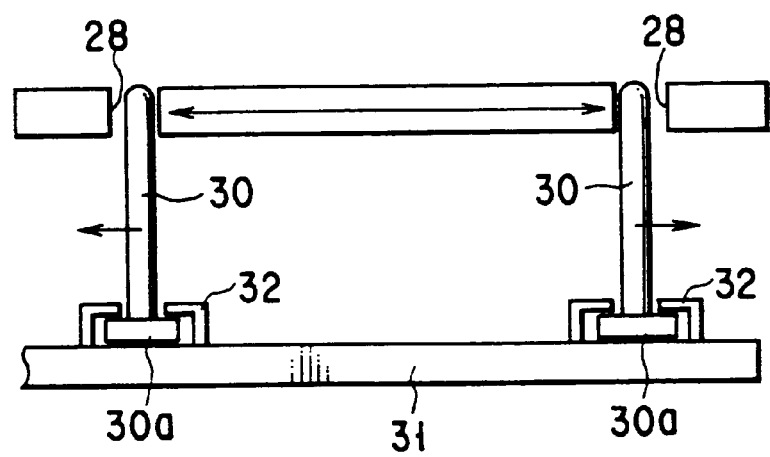

In applying a heat treatment to the substrate G, the heat treating apparatus of the present invention constructed as described above is operated as follows. In the first step, the support plate 22 is heated to a predetermined temperature falling within a range of, for example, about 120° C. to 150° C. Under this condition, the main arm 10a holding the substrate G is inserted through the opening 21a into the treating space 23 so as to dispose the substrate G on the support plate 22. Then, the stepping motor 34 of the lift mechanism 33 is driven to move the support pins 30 upward such that the substrate G is supported by the support pins 30, followed by moving the main arm 10a back to the original position. In this case, the holes 28 made in the support plate 22 are displaced by the thermal expansion of the support plate 22 from the ordinary positions under room temperature shown in FIG. 8A to the positions shown in FIG. 8B. However, the support pins 30 are held movable by the holding member 31 in a horizontal direction, as described previously. It follows that the support pins 30 are moved outward in accordance with the displacement of the holes 28 so as to project upright through the holes 28. In other words, the upward movement of the support pin 30 is not obstructed by the thermal expansion of the support plate 22. Also, the particle generation caused by the contact of the support pin 30 with the wall defining the hole 28 need not be worried about.

In the next step, the support pins 30 are moved downward to cause the substrate G to be held by the proximity spacers 40 projecting upward from the support plate 22. In this step, it is desirable for the substrate G to be held by vacuum suction temporarily on the support plate 22 so as to prevent deviation of the substrate G. The air cylinder 60 is driven simultaneously with the backward movement of the main arm 10a so as to move the door 27 upward, with the result that the gap setting projections 50 are allowed to abut against the lower surface of the upper wall 24 of the treating chamber to form the air inlet port 51 having a predetermined height h.

Then, a heat treatment is applied to the substrate G for a predetermined period of time. During the heat treatment, an ambient air is introduced through the air inlet port 51 into the treating space 23 at a predetermined flow rate. At the same time, an exhaust gas is discharged at a constant flow rate through the exhaust port 25 formed through the central portion of the upper wall 24 of the treating chamber. It follows that the heating temperature of the substrate G can be made uniform.

After completion of the heat treatment, the stepping motor 34 of the lift mechanism 33 is driven to move the support pins 30 upward so as to upheave the substrate G from the support plate 22. In this step, the main arm 10a is moved into the treating space 23 through the opening 21a for receiving the substrate G having the heat treatment applied thereto. Then, the support pins 30 are moved downward to cause the substrate G to be received by the main arm 10a. Further, the main arm 10a supporting the substrate G is moved outside the treating chamber 21 so as to carry the substrate G to the subsequent process step.

In the embodiment described above, the support plate 22 is held stationary, with the support pins 30 moved in a vertical direction so as to put or take the substrate G on or away from the support plate 22. However, it is not absolutely necessary for the apparatus to be constructed in this fashion. For example, the support pins 30 may be held stationary, with the support plate 22 moved in a vertical direction so as to achieve a relative movement between the support plate 22 and the support pins 30. Also, the gap setting projections 50 may be constructed to make the height h variable so as to obtain a desired air flow rate. Further, in the embodiment described above, the gap setting projections 50 are mounted to the movable door 27 so as to permit the projections 50 to abut against the lower surface of the upper wall 24 of the treating chamber so as to ensure a desired clearance of the air inlet port 51. However, it is also possible to mount the gap setting projections 50 to the lower surface of the upper wall 24 of the treating chamber so as to permit the projections 50 to abut against the horizontal piece 27b, which faces inward, of the movable door 27.

Further, in the embodiment described above, the heat treating apparatus of the present invention is applied to a coating-developing system for LCD substrates. However, the heat treating apparatus of the present invention can be used as an independent heat treating apparatus and can also be used in combination with, for example, a prober apparatus, an ashing apparatus and an exposure apparatus. Further, the heat treating apparatus of the present invention can be used for applying a heat treatment to a silicon wafer as well as to an LCD substrate.

As described above, the heat treating apparatus of the present invention produces prominent effects. To reiterate, the support plate is provided with holes large enough to permit support pins to extend therethrough freely. The support pin is held by a holding member in a manner to be movable in a horizontal direction. It follows that, even if the positions of the holes made in the support plate are displaced by thermal expansion of the support plate, the support pins are moved in a horizontal direction to conform with the displacement of the positions of the holes made in the support plate, with the result that the support pins are held upright to project through the holes made in the support plate so as to receive and deliver the object to be treated, e.g., an LCD substrate. What should also be noted is that the heat treating apparatus of the present invention permits suppressing the wear and particle generation caused by the direct contact of the support pin with the wall defining the hole made through the support plate, leading to an improved yield.

Further, the support pin used in the present invention comprises a metallic pin body having a rigidity and an auxiliary portion having a corrosion resistance made of a synthetic resin. Also, the wall defining the hole made in the support plate is coated with a synthetic resin film. As a result, it is possible to ensure suppressing the wear of the support pin and the particle generation caused by the direct contact between the support pin and the wall of the hole.

What should also be noted is that the heat treating apparatus of the present invention comprises a gap setting member attached to the cover member or to the shutter member. As a result, the gap setting member abuts against the lower surface of the cover member or the upper surface of the shutter member in accordance with an upward movement of the shutter member, making it possible to ensure a desired clearance accurately between the cover member and the shutter member. It follows that a predetermined amount of air can be introduced into and discharged from the treating space during the heat treating step, making it possible to make the air flow uniform so as to make the heating temperature uniform and to improve the yield.

What is claimed is:

1. A heat treating apparatus for baking a coating film on a large substrate, comprising:

a support plate for supporting a substrate to be treated, said support plate having a plurality of holes;

heating means for heating said substrate through said support plate; and support pins extending through said plurality of holes of said support plate so as to support said substrate, each of said support pins having a leg portion slidably mounted on said support plate, wherein each of said support pins is slidable in a horizontal direction within each hole of said plurality of holes in said support plate.

2. The apparatus according to claim 1, wherein said support pin comprises a pin body and an auxiliary portion mounted to the tip portion of said pin body and having a corrosion resistance.

3. The apparatus according to claim 2, wherein said support pin is made of stainless steel.

4. The apparatus according to claim 2, wherein said auxiliary upper end portion of the support pin is made of a material selected from the group consisting of PEEK, fluoroelastomer, and fluoroplastic.

5. The apparatus according to claim 1, wherein a coating film is formed on the surface of the wall defining said hole made through said support plate.

6. The apparatus according to claim 5, wherein said coating film is made of a material selected from the group consisting of a fluoroplastic and a sintered body thereof.

7. The apparatus according to claim 1, wherein a ratio D/L is 0.2 or more, where D denotes the width of the leg portion, and L denotes the length of the support pin.

8. The apparatus according to claim 1, further comprising spacer members, wherein said spacer members are mounted to a surface of said support plate which is brought into contact with said substrate to be treated.

9. The apparatus according to claim 1, further comprising pin lift means for moving said support pins in a vertical direction.

* * * * *